(12) United States Patent
von Elgg et al.

(10) Patent No.: US 8,977,778 B2
(45) Date of Patent: Mar. 10, 2015

(54) COMPRESSING, TRANSCODING, SENDING, AND RETRIEVING VIDEO AND AUDIO FILES IN A SERVER-BASED SYSTEM AND RELATED SYSTEMS AND METHODS

(75) Inventors: Ben Werdmuller von Elgg, Berkeley, CA (US); E. Paul Adrian, Boerne, TX (US); M. Jade Kurian, Boerne, TX (US); Carlos Laurel, San Antonio, TX (US); Joe Pelayo, San Antonio, TX (US)

(73) Assignee: Latakoo, Inc., Austin, TX (US)

( * ) Notice: Subject to any disclaimer, the term of this patent is extended or adjusted under 35 U.S.C. 154(b) by 258 days.

(21) Appl. No.: 13/598,444

(22) Filed: Aug. 29, 2012

(65) Prior Publication Data
US 2013/0054837 A1    Feb. 28, 2013

Related U.S. Application Data

(60) Provisional application No. 61/528,504, filed on Aug. 29, 2011.

(51) Int. Cl.
*G06F 15/16* (2006.01)
*G06F 17/30* (2006.01)
*H04L 29/06* (2006.01)
*H04L 29/08* (2006.01)
(Continued)

(52) U.S. Cl.
CPC ...... *G06F 17/30123* (2013.01); *H04L 65/4084* (2013.01); *H04L 67/06* (2013.01); *H04L 69/04* (2013.01); *H04N 21/2743* (2013.01); *H04N 21/4402* (2013.01); *H04N 21/4882* (2013.01); *H04N 21/6125* (2013.01); *H04N 21/6175* (2013.01); *H04N 21/84* (2013.01); *H04N 21/8456* (2013.01); *H04N 21/2181* (2013.01); *H04N 21/2543* (2013.01); *H04N 21/25875* (2013.01); *H04N 21/8193* (2013.01)
USPC .......................................... 709/247; 709/203

(58) Field of Classification Search
USPC .......................... 709/247, 203, 223–229, 250
See application file for complete search history.

(56) References Cited

U.S. PATENT DOCUMENTS

| 5,357,614 | A | | 10/1994 | Pattisam et al. | |
| 5,956,490 | A | * | 9/1999 | Buchholz et al. | 709/245 |

(Continued)

FOREIGN PATENT DOCUMENTS

WO    WO 2007/053957 A1    5/2007

OTHER PUBLICATIONS

International Search Report dated Nov. 26, 2012 in connection with International Patent Application No. PCT/US/2012/052900, 3 pages.

(Continued)

*Primary Examiner* — Zarni Maung

(57) ABSTRACT

A method, system and computer readable medium compress and send media files. The method includes sending a computer program for compressing and sending media files to a client computer. The computer program comprises program code for identifying information about a media file in response to receiving a request to send a media file, determining whether the media file is compressible based on the identified information, identifying a compression algorithm based on the identified information, compressing the media file using the compression algorithm, and sending the compressed media file to one or more server computers. The method further includes receiving the compressed media file sent from the client computer.

20 Claims, 9 Drawing Sheets

(51) Int. Cl.

| | |
|---|---|
| *H04N 21/2743* | (2011.01) |
| *H04N 21/4402* | (2011.01) |
| *H04N 21/488* | (2011.01) |
| *H04N 21/61* | (2011.01) |
| *H04N 21/84* | (2011.01) |
| *H04N 21/845* | (2011.01) |
| *H04N 21/218* | (2011.01) |
| *H04N 21/2543* | (2011.01) |
| *H04N 21/258* | (2011.01) |
| *H04N 21/81* | (2011.01) |
| *G06F 12/00* | (2006.01) |

(56) References Cited

U.S. PATENT DOCUMENTS

| | | | |
|---|---|---|---|
| 6,188,428 | B1 | 2/2001 | Koz et al. |
| 6,286,053 | B1* | 9/2001 | Van Peursem et al. ....... 709/247 |
| 6,345,279 | B1 | 2/2002 | Li et al. |
| 6,542,546 | B1 | 4/2003 | Vetro et al. |
| 6,842,768 | B1 | 1/2005 | Shaffer et al. |
| 2002/0078241 | A1* | 6/2002 | Vidal et al. .................... 709/247 |
| 2004/0179605 | A1 | 9/2004 | Lane |
| 2006/0195464 | A1* | 8/2006 | Guo .............................. 707/101 |
| 2008/0072261 | A1 | 3/2008 | Ralston et al. |
| 2008/0084925 | A1 | 4/2008 | Rozen et al. |
| 2008/0147864 | A1 | 6/2008 | Drogo De Iacovo et al. |
| 2008/0195761 | A1 | 8/2008 | Jabri et al. |
| 2008/0209073 | A1* | 8/2008 | Tang ............................. 709/247 |
| 2009/0049150 | A1* | 2/2009 | Malik ........................... 709/206 |
| 2009/0170760 | A1* | 7/2009 | Suzuki ............................ 514/12 |
| 2010/0034256 | A1 | 2/2010 | Bennett |
| 2010/0094728 | A1 | 4/2010 | Denning et al. |
| 2010/0094931 | A1 | 4/2010 | Hosur et al. |
| 2010/0266009 | A1 | 10/2010 | Sedeffow |
| 2011/0107369 | A1 | 5/2011 | O'Brien et al. |
| 2011/0167173 | A1* | 7/2011 | Bansal et al. ................. 709/247 |

OTHER PUBLICATIONS

Written Opinion of the International Searching Authority dated Nov. 26, 2012 in connection with International Patent Application No. PCT/US2012/052900, 4 pages.

\* cited by examiner

COMPRESSING, TRANSCODING, SENDING, AND RETRIEVING VIDEO AND AUDIO FILES IN A SERVER-BASED SYSTEM AND RELATED SYSTEMS AND METHODS

CROSS-REFERENCE TO RELATED APPLICATIONS AND CLAIM OF PRIORITY

The present application is related to U.S. Provisional Patent Application No. 61/528,504 filed Aug. 29, 2011 entitled "COMPRESSING, TRANSCODING, SENDING, AND RETRIEVING VIDEO AND AUDIO FILES IN A SERVER-BASED SYSTEM AND RELATED SYSTEMS AND METHODS." U.S. Provisional Patent Application No. 61/528,504 is hereby incorporated by reference into the present application as if fully set forth herein. The present application hereby claims priority under 35 U.S.C. §119(e) to U.S. Provisional Patent Application No. 61/528,504.

TECHNICAL FIELD

The present disclosure relates generally to the transfer of files. More specifically, the present disclosure relates to compressing, transcoding, sending, and retrieving media files in a server-based system and related systems and methods.

BACKGROUND

Although video data is an important part of digital life, transmitting video data remains an arduous process. Video files are often very large, and the size of video files can make transfer over the Internet a lengthy process. Moreover, video transfer systems can use a large number of coder-decoder programs (codecs) and associated encoding formats. Video transfer systems may also use a similarly large number of "wrapper" formats that encapsulate video data and associated metadata. Therefore, even when a lengthy Internet transfer process is complete, it is not certain that a recipient has the ability to view the video.

Video files on web servers are typically stored in a single, common format. This is usually an acceptable situation when users only want to play video. However, in certain situations, a recipient may want to edit received videos. Unfortunately, video editing software often must run a time-consuming process on popular web video formats, resulting in a poor user experience.

In addition, digital media files are often measured in terms of file size, such as megabytes and gigabytes. However, to a non-technical user, this may be difficult to understand. This is also inconsistent with other units of measurement used in handling video files. For example, while watching a video, a user's progress is measured in terms of hours, minutes, and seconds.

There are many services on the Internet for sharing digital media. For example, users may share rich text, audio, video and interactive content. However, users often have the burden to publish such digital media files. Additionally, such services are often web-based and do not allow for access from different kinds of devices, software, and interfaces.

SUMMARY

This disclosure provides methods, systems and computer readable media for compressing and sending video and audio files in a server-based system. This disclosure also provides methods, systems and computer readable media for transcoding files on download from a web application. This disclosure further provides methods, systems and computer readable media for depleting account credit based on a length of a digital media file. In addition, this disclosure provides methods, systems and computer readable media for server-side support for buying and selling digital media files.

Various embodiments of the present disclosure provide methods, systems and computer readable media for compressing and sending media files. In one embodiment, a method includes sending a computer program for compressing and sending media files to a client computer. The computer program includes program code for identifying information about a media file in response to receiving a request to send a media file. The computer program also includes program code for determining whether the media file is compressible based on the identified information, identifying a compression algorithm based on the identified information, and compressing the media file using the compression algorithm. The computer program further includes program code for sending the compressed media file to one or more server computers. The method further includes receiving the compressed media file sent from the client computer.

Various embodiments of the present disclosure provide methods, systems and computer readable media for transcoding files on download. In one embodiment, a method includes sending a request from a client to receive a media file from a server. The method also includes receiving a selection of a file format for the media file to be received. The method further includes receiving the media file in an initial format. Additionally, the method includes transcoding the media file from an initial file type to the selected file type.

Various embodiments of the present disclosure provide methods, systems and computer readable media for depleting account credit based on a length of a digital media file. In one embodiment, a method includes receiving at a server a media file from a client. The method also includes identifying a length of content stored in the media file. Additionally, the method includes depleting account credit based on the length of the media file.

Various embodiments of the present disclosure provide methods, systems and computer readable media for buying and selling digital media files. In one embodiment, a method includes providing a marketplace associated with a plurality of sortable media items. The method also includes receiving a request to purchase a media item. The method further includes depleting an account associated with a purchaser of the media item. Additionally, the method includes crediting an account associated with a seller of the media item.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Various embodiments of the present disclosure recognize that sending media over the Internet can be complicated and timely. Accordingly, embodiments of the present disclosure allow users to simplify the process of sending media while reducing the amount of time needed to send the media. For example, in various embodiments, all a user needs to do is specify a location of a file for the media file to be sent automatically. Embodiments of the present disclosure perform all the work of identifying proper compression techniques, compressing, uploading, sending, and transcoding media files in a media transfer environment. For example, embodiments of the present disclosure enable a "one-click" service for sending media.

Figure 1:
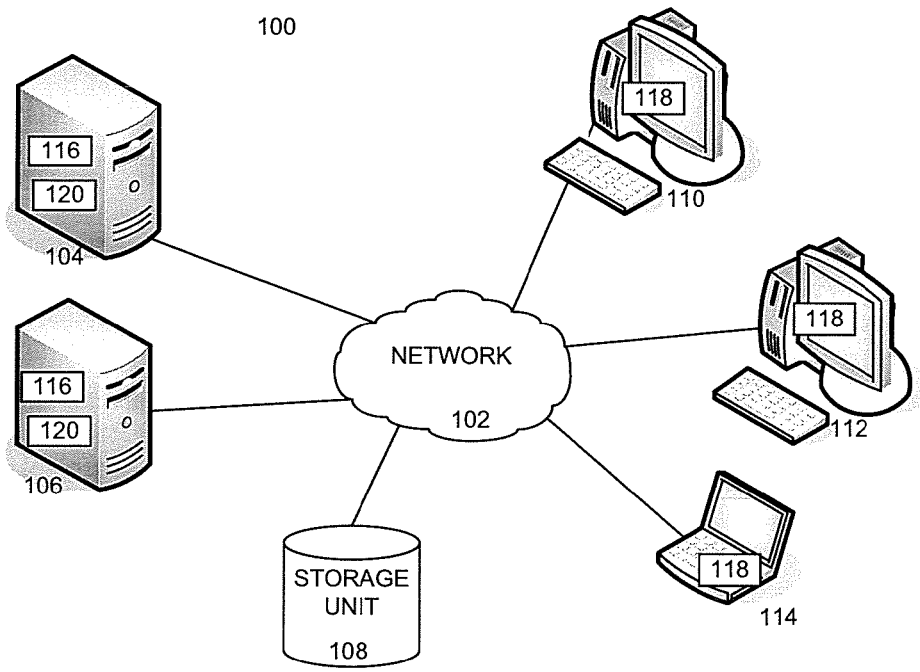
FIG. 1 illustrates an example networked system of computing devices in which various systems and methods described below can be implemented.

FIG. 1 illustrates an example networked system 100 of computing devices in which various systems and methods described below can be implemented. As shown in FIG. 1, the system 100 includes a network 102, which is the medium used to provide communication links between various computers and other devices. The network 102 may include any suitable connections, such as wired, wireless, or fiber optic links. In some embodiments, the network 102 represents at least a portion of the Internet and can include a worldwide collection of networks and gateways that use the Transmission Control Protocol/Internet Protocol suite of protocols to communicate with one another.

In this example, server computers 104-106 connect to the network 102, along with a storage unit 108. In addition, client computers 110-114 connect to the network 102. The client computers 110-114 may be, for example, personal computers, network computers, or mobile computing devices. In FIG. 1, the server computers 104-106 could provide information, such as boot files, operating system images, and applications to client computers 110-114. The client computers 110-114 are clients to the server computers 104-106 in this example. The system 100 may include additional server computers, client computers, or other devices.

Program code in the system 100 may be stored on a computer recordable storage medium and downloaded to a computer system or other device for use. For example, program code may be stored on a computer recordable storage medium on the server computers 104-106 and downloaded to the client computers 110-114 over the network 102 for use by the client computers 110-114.

In some embodiments, a web application may be used to perform functions related to compressing, transcoding, receiving, and sending media files. A web application is an application that may be accessed over a network (such as the network 102) to perform functions for a client computer (such as client computers 110-114).

In FIG. 1, the server computers 104-106 may be web servers running program code for the web application, which is accessible by the client computers 110-114. A browser or other application on each client computer 110-114 can access the web application to perform functions related to compressing, transcoding, receiving, and sending video files. These video files can be located on the client computers 110-114 or stored remotely on the server computers 104-106 or storage unit 108.

In some embodiments, a client application 118 of the web application may be downloaded and installed on the client computers 110-114. This client application 118 can perform functions on the client computer for compressing, transcoding, receiving, and sending video files at the client computer. The client application 118 or a client portion of the web application communicates with a server application 116 or a server portion of the web application.

Of course, the system 100 may be implemented using a number of different types of networks, such as an intranet, a local area network (LAN), or a wide area network (WAN). FIG. 1 is intended as an example and not as an architectural limitation for the different embodiments described below. Each of the computing devices includes any suitable structure for performing the described functions. Each computing device could, for example, include one or more processing units, one or more memory units storing data and instructions used by the processing unit(s), and one or more interfaces for communicating over the network 102.

Figure 2:
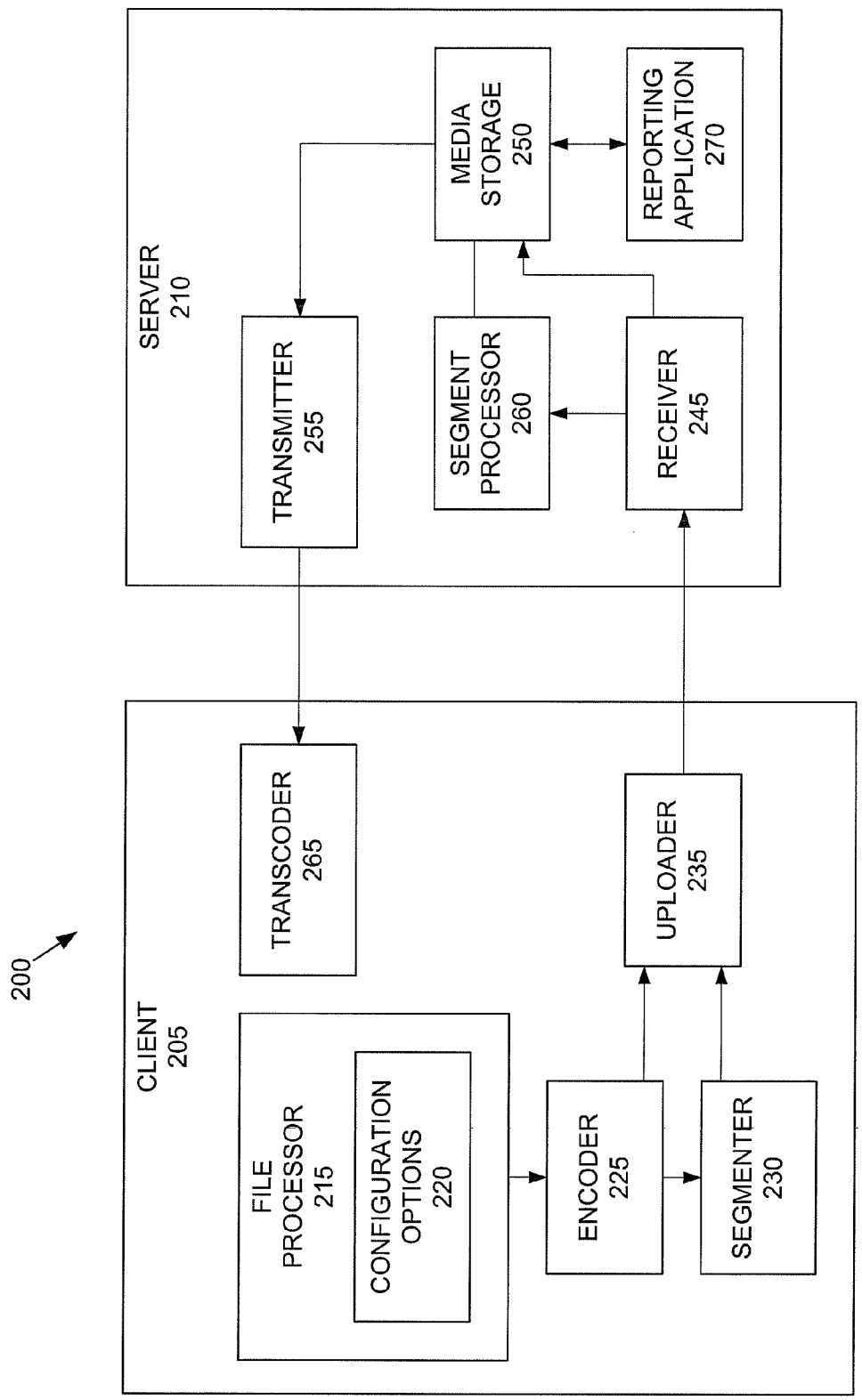
FIG. 2 illustrates an example media transfer system in accordance with various embodiments of the present disclosure.

FIG. 2 illustrates an example media transfer system 200 in accordance with various embodiments of the present disclosure. For example, the media transfer system 200 provides an environment where media files may be compressed, sent, transcoded and/or retrieved. The media files may be any type or combination of types of media. For example, the media files may include picture, video, audio, animation and/or any other suitable type of media. In this illustrative embodiment, the system 200 includes client 205, which is an example of one embodiment of client computers 110-114 and/or client application 118. The system 200 also includes server 210, which is an example of one embodiment of server computers 104-106 and/or server application 116.

Embodiments of the present disclosure enable compressing and sending of video and audio files in a server-based system. In various embodiments of the present disclosure, the client 205 is configured to compress and send video files. The client 205 accesses a web application over a network connection to send video and audio files. For example, the client 205 may download a computer program (such as client application 118) to compress and send video files.

When a user desires to send a video or audio file, the client 205 can obtain the user's account credentials. For example, the client 205 may prompt the user to enter the account credentials (such as username and password). The client 205 may also retrieve the account credentials from other sources, such as from a configuration file or a network administration policy.

When the user is authenticated to the server 210, the server 210 may supply further information relating to the method of file upload. For example, if the upload is to be performed via a File Transfer Protocol (FTP) connection, the server 210 might return the name of the upload server and a username and password to instantiate the connection. Another upload might be via a series of hypertext transfer protocol (HTTP) requests, in which case the server 210 might return a string of characters to use to verify the authenticity of later requests.

Figure 3A:
FIG. 3A illustrates an example window that may be displayed to a user for identifying files to be sent in accordance with various embodiments of the present disclosure.

When the user is authenticated to the server 210, a file processor 215 in the client 205 identifies locations of video or audio files to be sent. For example, the client 205 may generate a window that is displayed to the user. FIG. 3A illustrates an example window that may be displayed to a user for identifying files to be sent in accordance with various embodiments of the present disclosure. A user may drag and drop files into this window. In other examples, the client 205 may receive a file path specifying a location of a file, an input over a command-line, or a selection of a file via a dialog box.

Figure 3B:
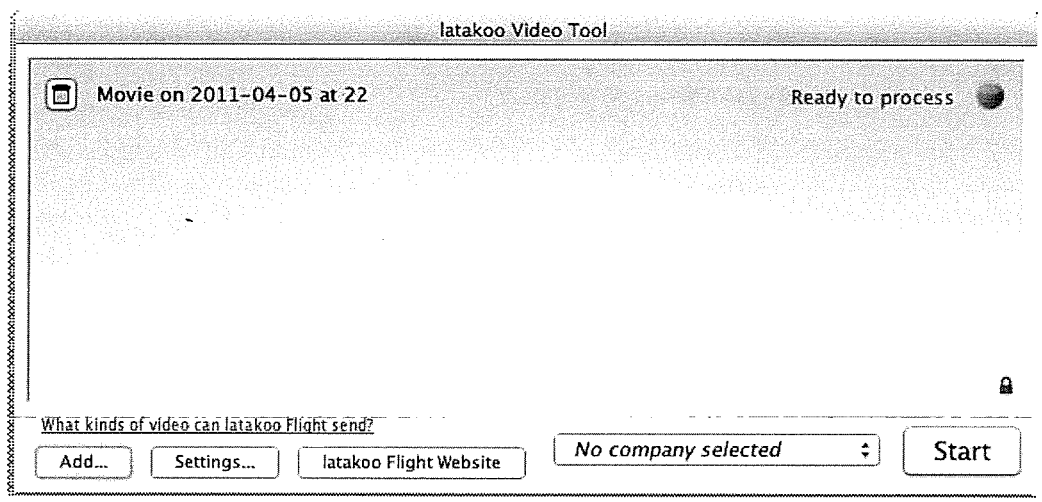
FIG. 3B illustrates an example window showing a file location provided, which is awaiting a user command to compress and upload the file, in accordance with various embodiments of the present disclosure.

Once one or more file locations have been provided, the client 205 can wait to receive a command to begin compressing and uploading the file(s). For example, FIG. 3B illustrates a screen shot of a window having a file location provided, which is awaiting a user command to compress and upload the file, in accordance with various embodiments of the present disclosure.

Once compression and uploading are commenced, the file processor 215 examines each file to determine whether the media file is compatible with the compression process. For example, the file processor 215 can compare each file's format with a list of file formats supported by the server 210. The file processor 215 may discard or flag files that are not compatible. The client 205 may also present the user with feedback to alert the user that a file has been discarded or flagged.

In particular embodiments, the following formats are examples of container formats that may be compatible with the server 210: Advanced Systems Format (.ASF, .WMV), Matroska (.MKV), MPEG program stream (.MPG, .MPEG), MPEG transport stream (.TS, .M2T), MPEG-4 Part 14 (.MP4), QuickTime (.MOV), 3GP (.3gp, 3gpp), and Flash Video (.FLV). Examples of supported video codecs could include the following codecs: APPLE DV/DVCPro, Avid DV, Avid DV100, Avid Meridien, Blackmagic 10-bit and 8-bit, HDV Mode 3, DVCPRO 35, DVCPRO 50, DVCPRO HD, MPEG 4 Part 3, MICROSOFT DV, MPEG2 HDV1, MJPEG, H.263, H.264, VP3, VP6 (On2), WVC1 (Windows Media Video 9), WVC1 (Windows Media Video 9) HD, Huffyuv, Sorenson 3, Sorenson Spark, SONY YUV, Theora, and Raw RGB uncompressed. Examples of supported audio codecs could include the following codecs: Advanced Audio Coding (AAC), AC-3, MP3, Pulse-code modulation (PCM), Vorbis, and Windows Media Audio (WMA).

The file processor 215 can retrieve configuration options 220 for the compression of the video or audio files. The configuration options 220 may be preset in the client application 118 upon download or selected by a user of the client 205 in advance or during the compression and sending of the media files. The configuration options 220 may relate to the individual file format or all files to be compressed. For example, the configuration options 220 may include options such as a maximum or minimum compression size of the file, a selection of how quickly a user request the compression and transfer processes to occur (i.e., based on file size and bandwidth availability), resolution, image or video quality, compression algorithm, file format, and/or any other settings or options for compressing and sending the media file.

Figure 3C:
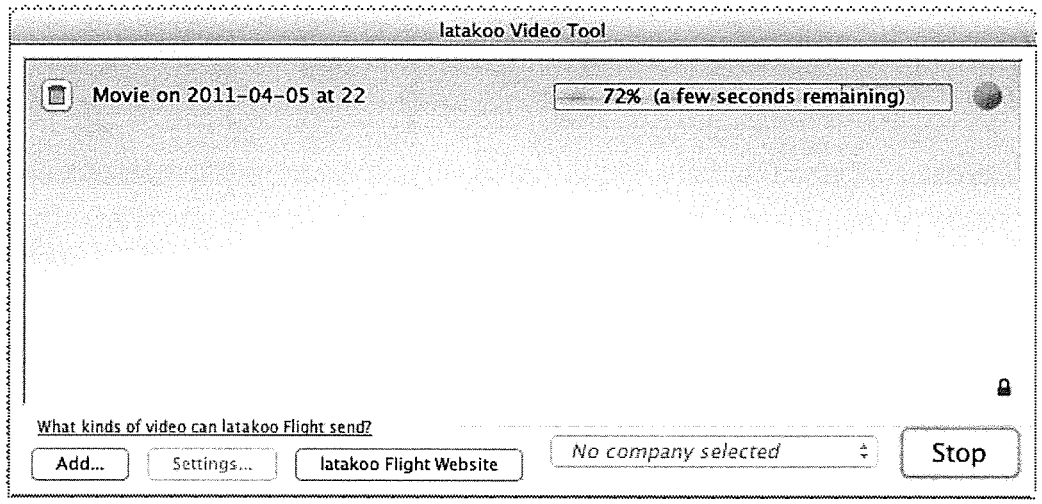
FIG. 3C illustrates an example window showing the progress of a file being compressed by a client application in accordance with various embodiments of the present disclosure.

The file processor 215 passes the location of a file and the compression configuration options 220 to an encoder 225. The encoder 225 encodes the media file in a format for upload. For example, the encoder 225 may compress the media file into a smaller size for increased transferability of the media file. In some embodiments, the encoder 225 may be downloaded from the server 210 to the client 205. The encoder 225 may include a compression library or program code that is incorporated into the client application 118. The client 205 can monitor the compression for progress and any error messages and alert the user appropriately. For example, FIG. 3C illustrates an example window showing the progress of a file being compressed by the client application 118. The file may be compressed according to any suitable format.

Figure 3D:
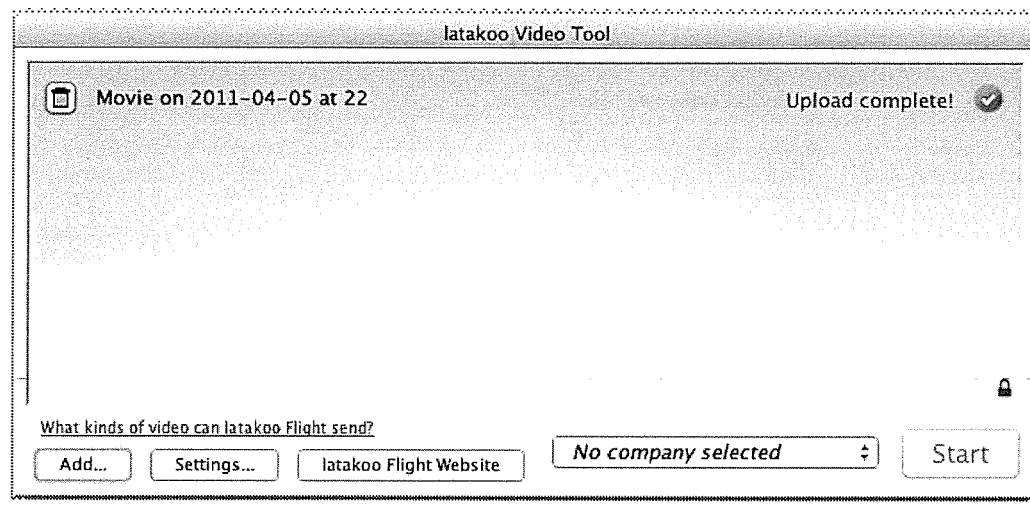
FIG. 3D illustrates an example window showing that a file has been uploaded in accordance with various embodiments of the present disclosure.

An uploader 235 (such as a network card and/or software for uploading files) in the client 205 then begins to upload the file to the server 210 using an appropriate method. For example, the uploader 235 may transfer the file using FTP or HTTP requests. The uploader 235 also monitors the upload progress. When the file has finished uploading, the uploader 235 reports the completion to the user. The uploader 235 may also send a further request to the server. For example, the uploader 235 may request to receive confirmation that the file was received intact. FIG. 3D illustrates an example window showing that a file has been uploaded. Thus, a user simply needs to drag and drop a media file into a window for the client 205 to compress and upload the media file. In this manner, the media transfer system 200 can enable a "one-click" service for transferring media files.

In these examples, the uploader 235 uploads compressed files from the client 205 to a receiver 245 (such as a network card and/or software for receiving uploaded files) on the server 210. The compressed files may be stored in a media storage 240 (e.g., on the server computer 104-106 or the storage unit 108 in FIG. 1). Once uploaded, the compressed files may be retrieved from a transmitter 255 (such as a network card and/or software for downloading files) via a network (e.g., the network 102). For example, a user desiring to access a compressed file may access the compressed file via any computer connected to the network 102. As a particular example, files uploaded from the client computer 110 may be accessed by the client computers 112 and 114.

In various embodiments, the client 205 may simultaneously compress and upload portions of the media file to decrease a total time required to upload the media file. For example, based on computing resources (such as processor speed and memory size and speed) and the compression algorithm, the compression and/or encoding of the media file may take a considerable amount of time. During this compression time, the computer resources are constrained and network resources (such as available bandwidth) may not be constrained. As a result, compressed portions of the media file may be uploaded while other portions of the media file are still being compressed. The parallelization in the use and performance of tasks by the computing resources and the network resources can result in a significant decrease in the total time needed to compress and send the media file.

In this illustrative embodiment, the client 205 includes a segmenter 230. The segmenter 230 monitors the output of the encoder 225 and creates segments from the portions of the media file that have been compressed. The lengths of these segments may have equal lengths but may also have dynamic lengths depending on factors including settings from the client, instructions from the server and the output from the encoder 225. The uploader 235 monitors the new segments as they are created and begins uploading the segments of the media file as soon as they are ready.

On the server 210, the segments of the media file are managed by a segment processor 260. For example, in some embodiments, the segment processor 260 may join and/or concatenate segments together as a single file that is ready for viewing or download. The segment processor 260 may also store the segments separately without initially joining the segments. Upon receipt of a request to view or download the media file, the segment processor 260 may piece the segments together, such as at run-time using a script. For example, the segment processor 260 may piece the segments together upon download or allow only a portion of a complete media file to be downloaded. In other examples, the segment processor 260 may stream the separate segments as a complete media file. For example, in the example of video, the web browser or client application at the client 205 may view the video as a contiguous, compatible video file.

While only one server and client are depicted in FIG. 2, any number of different servers and clients may exist in media transfer system 200. For example, the client 205 may obtain the client application 118 from one server and send the compressed media file to a different server. In other examples, one server may receive the uploaded media files, another server may store the media files, and yet another server may be used for the media file to be sent or downloaded.

Figure 4:
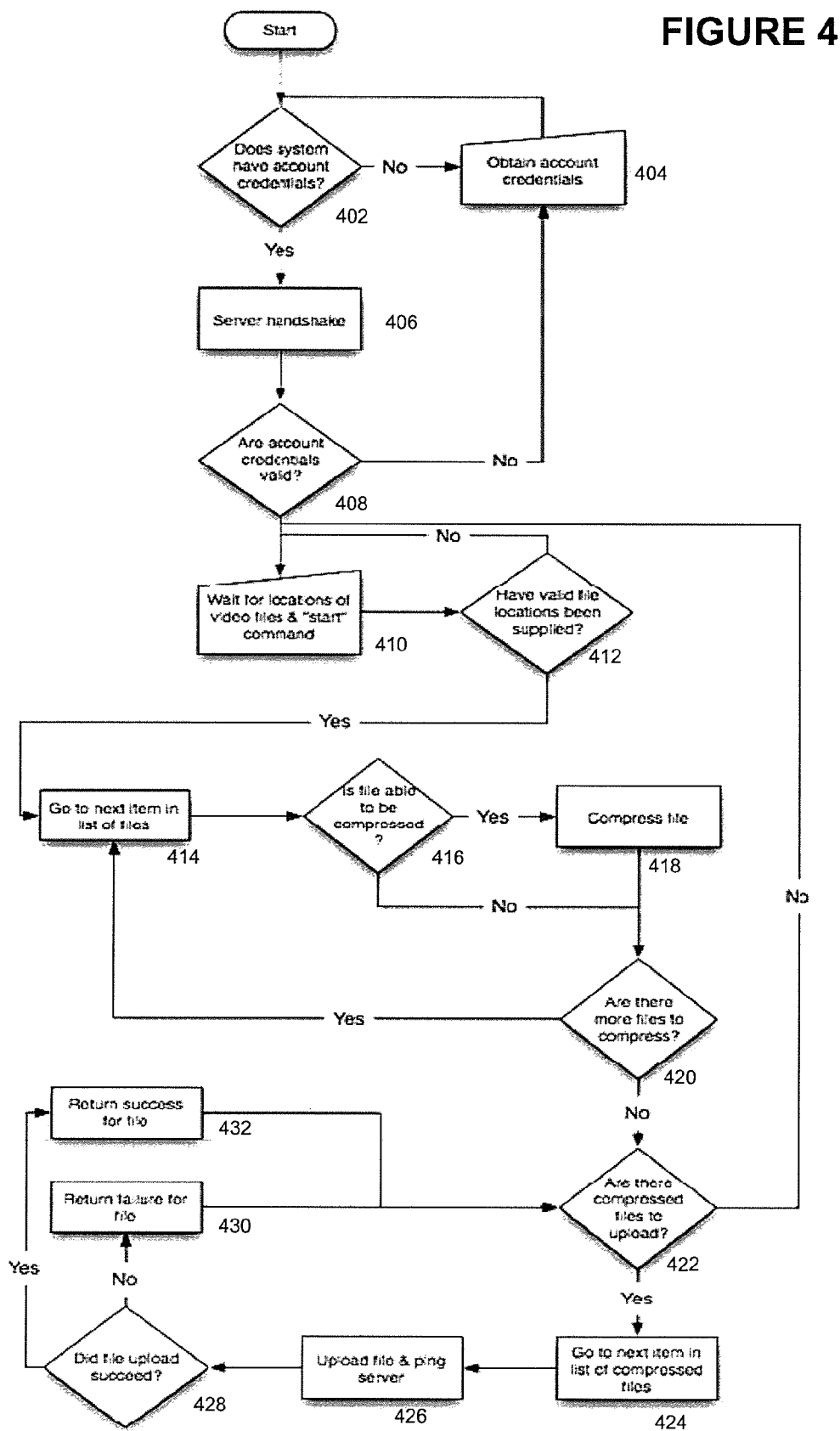
FIG. 4 illustrates an example process for compressing and uploading a file in accordance with various embodiments of the present disclosure.

FIG. 4 illustrates an example process for compressing and uploading a file according to various embodiments of the present disclosure. The process can be performed, for example, by one or more client computers, such as client computers 110-114 in FIG. 1 and/or client 205 in FIG. 2. The process can be implemented by executable instructions stored in a non-transitory computer-readable medium that cause one or more devices to perform such a process.

The process begins by determining whether the client application has obtained account credentials of a user (step 402). If account credentials have not been obtained, the process obtains the account credentials (step 404). In step 404, the client application may request the account credentials from the user or retrieve the account credentials from a file or other source. When account credentials have been obtained, the process supplies the credentials to the server (step 406). The process determines whether the account credentials are valid (step 408). If the process determines that the account credentials are not valid, the process returns to step 404 and attempts to obtain valid account credentials.

If the account credentials are valid, the process waits for location(s) of video or audio file(s) and a start command (step 410). In step 410, a user may specify a location of one or more files to be compressed and uploaded. Thereafter, the process determines whether valid locations of video or audio files have been supplied (step 412). If valid locations of video or audio files have not been supplied, the process returns to step 410 and continues to wait for valid locations of video or audio files and the start command. If valid locations of video or audio files have been supplied, the process obtains a next item in the list of files (step 414). The process determines whether the file obtained is able to be compressed (step 416). In step 416, the process may compare the file type with a list of compatible file types. If the file cannot be compressed, the process proceeds to step 420 discussed below. If the file can be compressed, the process compresses the file (step 418).

The process determines whether additional files to be compressed are present (step 420). If additional files to be compressed are present, the process returns to step 414 and obtains a next item in the list of files. If additional files to be compressed are not present, the process determines whether there are compressed files to upload (step 422). If there are no compressed files to upload, the process returns to step 410 and continues to wait for locations of video or audio files and a start command. If there are compressed files to upload, the process obtains a next item in the list of compressed files (step 424) and uploads the file to a server (step 426).

The process determines whether the file was successfully uploaded (step 428). If the file was not successfully uploaded, the process returns an error message (step 430). If the file was successfully uploaded, the process returns a success message (step 432). The process returns to step 422 and determines whether there are additional compressed files to upload. If there are no additional files to upload, the process may terminate. The process may also terminate when a user closes the program.

Figure 5:
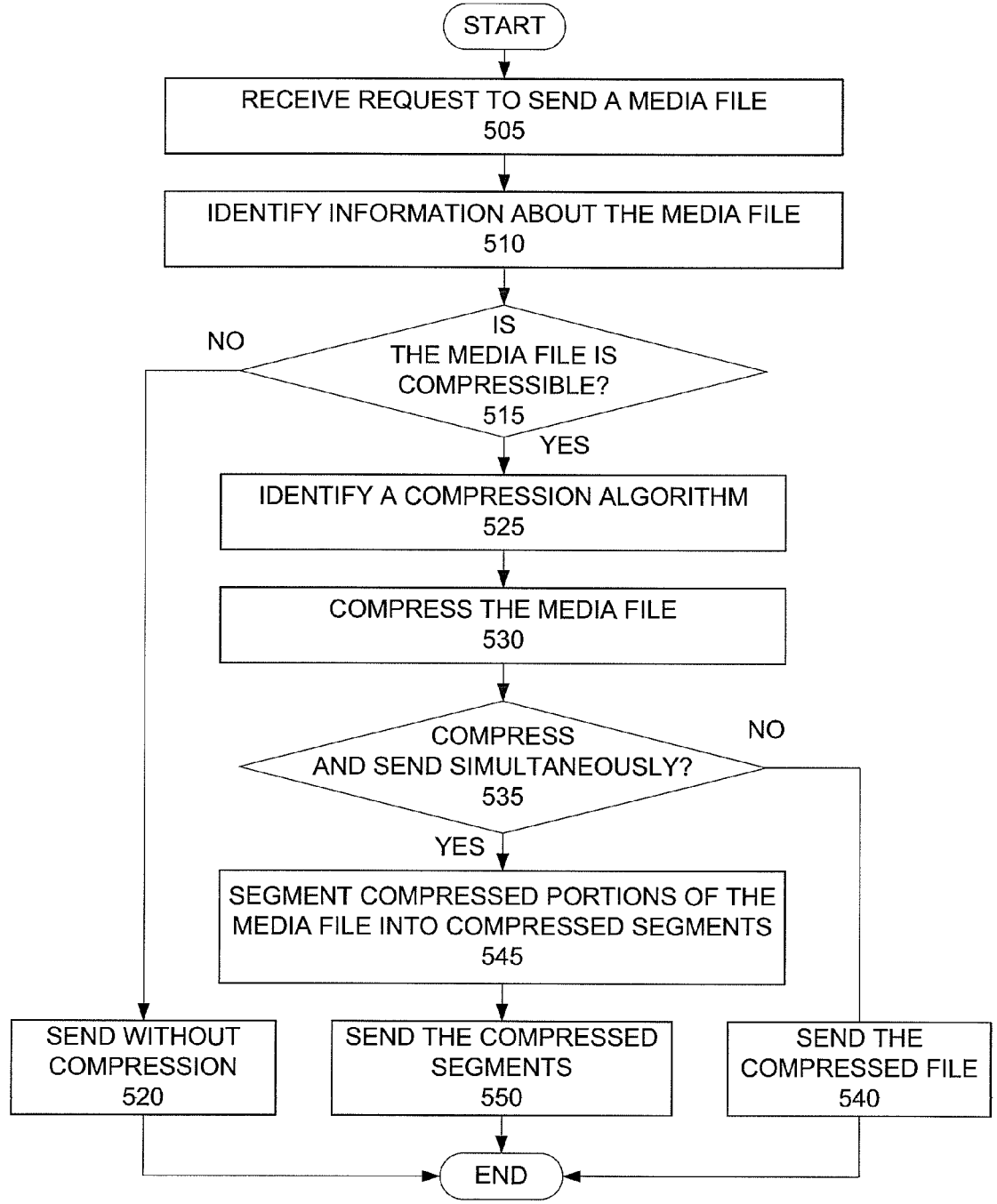
FIG. 5 illustrates an example process for compressing and sending media files in accordance with various embodiments of the present disclosure.

FIG. 5 illustrates an example process for compressing and sending media files in accordance with various embodiments of the present disclosure. For example, the process illustrated in FIG. 5 is an example of one embodiment of steps 414-418 in FIG. 4. The process can be performed, for example, by one or more client computers, such as client computers 110-114 in FIG. 1 and/or client 205 in FIG. 2. The process can be implemented by executable instructions stored in a non-transitory computer-readable medium that cause one or more devices to perform such a process.

The process begins by receiving a request to send a media file (step 505). For example, in step 505, the process may launch the client application 118 and provide a window (such as that illustrated in FIG. 3A) for a user to select a media file to send. The request may be received by dragging and dropping a media file into the window or specifying a file path for the media file.

The process then identifies information about the media file (step 510). For example, in step 510, the process may identify a location of the media file on the client computer, a file format of the media file, a resolution of the media file, a type of the media file (e.g., a video clip, a fast moving sports video, a slower moving landscape video, a picture, or an audio file) and selected configuration options of how to compress the media file. Thereafter, the process determines whether the media file is compressible (step 515). For example, in step 515, the process may determine whether the file type of the media file is in a format that is supported by the encoder 225. If the process determines that the media file is not compressible, the process sends the media file without compression (step 520), with the process terminating thereafter. Alternatively, in step 520, the process may return an error message that the compression and sending of the file is not possible.

Returning to step 515, if the process determines that the media file is compressible, the process identifies a compression algorithm to use in compressing the media file (step 525). For example, in step 525, the process may identify the compression algorithm based on a file format of the media file, a size of the media file, a type of content included in the media file, and/or selected configuration options for compression size, quality and/or upload/download time estimates. The process then compresses the media file (step 530). For example, in step 530, the process may compress the media file using the selected compression algorithm. Thereafter, the process determines whether to compress and send simultaneously (step 535). For example, in step 535, the option to compress and send simultaneously may be selected as a default or may be selected from one of the configuration options 220. If the process determines not to compress and send simultaneously, the process waits for the compression to complete and sends the compressed file to the server (step 540), with the process terminating thereafter.

Returning to step 515, if the process determines to compress and send simultaneously, the process segments compressed portions of the media file into compressed segments (step 545). For example, in step 545, the process may monitor the compressed portions of the media file to segment the compressed portions into separately uploadable segments. The length of these segments may be static or dynamic. The process segments the compressed portions of the media file while other portions of the media file are being compressed. The process then sends the compressed segments to one or more server computers (step 550), with the process terminating thereafter. For example, in step 550, the process may send the compressed segments while portions of the media file are still being compressed.

This disclosure also provides systems and methods for transcoding files on download from a web application. In some embodiments, this functionality utilizes Uniform Resource Identifiers (URIs). URIs are strings of characters used to identify the location of a resource on the Internet. The string includes a URI scheme identifying the type of URI, followed by a colon and some scheme-specific information. The scheme-specific information is typically the file path location of the resource. For example, in a World Wide Web URI, the URI scheme is "http", followed by a colon and the location of the described web page.

In these embodiments, the client 205 can perform functions for transcoding files on download from a web application. For example, when the client application 118 is installed on a client computer 110-114, the client application 118 can register as a "helper application" with a web browser on the client computer. A helper application is an application referenced by a browser to assist in handling different file formats that may be encountered. The client application 118 can register in a variety of ways. For example, the client application 118 may change a browser's internal configuration or change an operating system registry. The client application 118 also establishes a unique URI scheme name for each possible file download format. The effect is to associate the client application 118 with these scheme names so that the browser launches the client application 118 when a file is downloaded by the browser.

When the user attempts to access a URI where the protocol component corresponds to a previously established URI scheme name, the client application 118 is automatically loaded by the web browser. The client application 118 then determines the location of the requested file by changing the scheme name portion of the URI to a pre-selected one that is widely supported. For example, the client application 118 may change the URI scheme to HTTP.

In this way, the client application 118 ensures that the URI refers to a valid location. By examining the file name extension of the file, the client application 118 determines whether the file is in a supported input format. Additionally, the URI may include information, for example, to pass user session information to the video tool or to identify the link for the purpose of site usage analytics.

If the URI refers to a valid location and the file is in a supported input format, the client application 118 downloads the file from the URI location. The transcoder 265 in the client 205 also transcodes the file into the video or audio format associated with the protocol name. The client application 118 may further report incremental progress to the user in a visible or audible manner. The transcoded file can be saved in a location established by the configuration of the client application 118. The location may be set as a default value or be chosen by the user. The location may also be selected by a policy or administrator. The client application 118 may provide a notification to the user, and the file may be opened by the client 205 in response to user input.

As a specific example, for a video that might be downloaded using standard HTTP, the URI may be "http:" followed by "//latakoo.com/-/video/1877/download". The client application 118 may modify this URI scheme to download the same video in a format selected for editing in a particular editing program. For instance, a URI scheme selected for the FINAL CUT PRO video editing software may be: "latakoofcp://latakoo.com/-/video/1877/download/-/-/transcode/1311214392/5711a21d8749ef5d91087b3181e656a2/sampleRGB_2.mp4" In these embodiments, the URI can be augmented with session information and further descriptive information in order to identify the kind of download for the purpose of site analytics.

Figure 6:
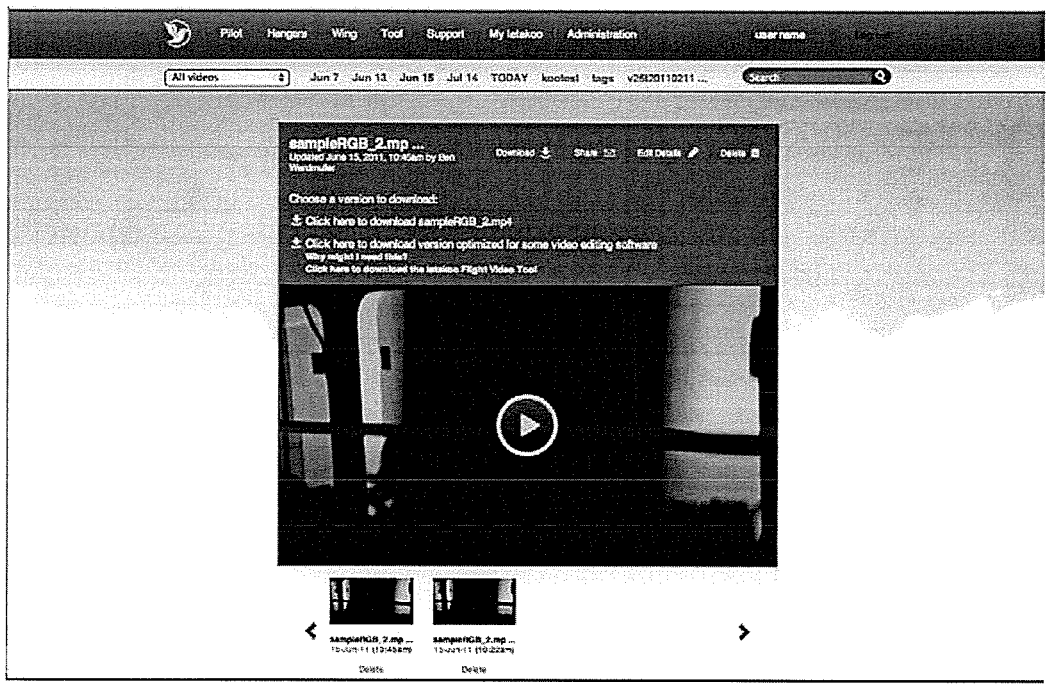
FIG. 6 illustrates a screen shot of an example user interface for selecting a file format for a video or audio file to be downloaded and transcoded in a selected format in accordance with various embodiments of the present disclosure.

FIG. 6 illustrates a screen shot of an example user interface for selecting a file format for a video or audio file to be downloaded and transcoded in a selected format according to various embodiments of the present disclosure. In this illustrative example, two links are provided for downloading the media file named "sampleRGB_2." The first link is an HTTP download as an "MP4" file format. The second link uses a URI scheme that will transcode the video into a format optimized for video editing software, such as FINAL CUT PRO.

Figure 7:
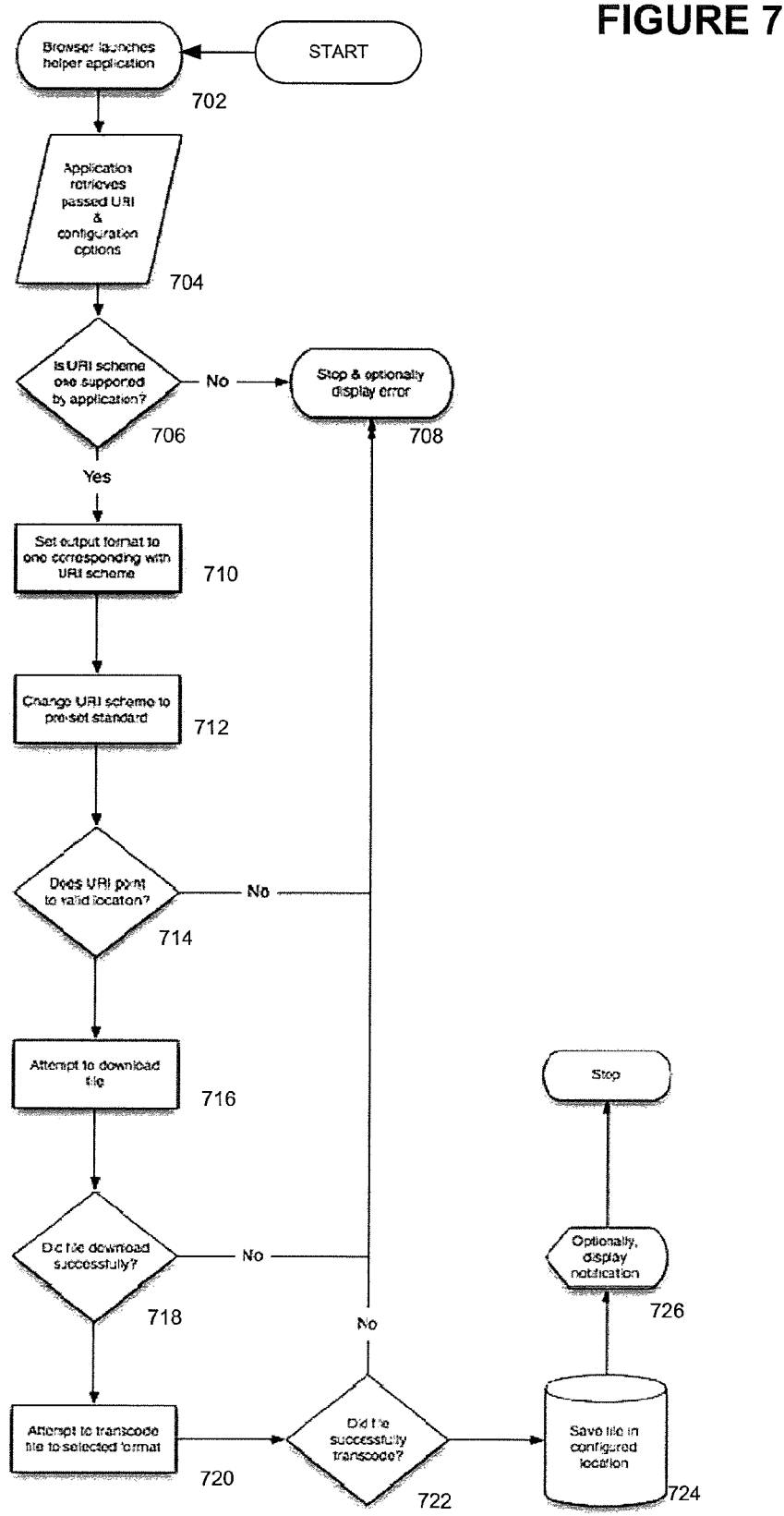
FIG. 7 illustrates an example process for transcoding files on download from a web application in accordance with various embodiments of the present disclosure.

FIG. 7 illustrates an example process for transcoding files on download from a web application according to various embodiments of the present disclosure. The process can be performed, for example, by one or more client computers, such as client computers 110-114 in FIG. 1 and/or client 205 in FIG. 2. The process can be implemented by executable instructions stored in a non-transitory computer-readable medium that cause one or more devices to perform such a process.

The process begins by a browser launching a helper application (step 702). In step 702, a user may have clicked on a link for a video or audio file in a certain format. The helper application may be registered with the browser to be launched when links with the certain format are selected. The process retrieves a passed URI and configuration options (step 704). In step 704, the URI and configuration options may include the identification of the file format and URI scheme. The process determines whether the URI scheme is supported by the application (step 706). If the URI scheme is not supported, the process may return an error message (step 708) and terminate.

If the URI scheme is supported, the process sets an output file format to one that corresponds to the URI scheme (step 710). The process changes the URI scheme to a pre-set standard (step 712). The process determines whether the URI points to a valid location (step 714). If the URI does not point to a valid location, the process returns to step 708 and may return an error message. If the URI points to a valid location, the process begins to download the file (step 716). The process determines whether the file downloaded successfully (step 718). If the file did not download successfully, the process returns to step 708 and may return an error message.

If the file downloaded successfully, the process begins to transcode the file to the set output file format (step 720). In step 720, the output file format may, for example, be selected by the user or specified in the client application. The process determines whether the file was transcoded successfully (step 722). If the file was not transcoded successfully, the process returns to step 708 and may return an error message. If the file was transcoded successfully, the process saves the file in a selected location (step 724). The process optionally displays a notification of success (step 726) and terminates.

This disclosure further provides systems and methods for depleting account credit based on a length of a digital media file. In some embodiments, user account information is stored by a central service, such as a server computer 104-106 or the server 210. The user account information can include information about a user's credentials, files uploaded by the user, and an amount of credit the user has for uploading files.

As shown in FIG. 2, the server 210 includes a reporting application 270. The reporting application 270 has the ability to report the length of a media file. For example, in the case of video files, the reporting application 270 may include a coder-decoder or compressor-decompressor (codec) library or application. The reporting application 270 may also be a component of the server computers 104-106 or be installed on a separate computer. The reporting application 270 is triggered to check the length of a file in response to an action. For example, the reporting application 270 may check the length of a media file when the media file has been uploaded. The length can represent the time duration of the media file when played in some units of time (such as minutes and seconds).

The reporting application 270 also retrieves user information. The retrieval may be through submission of authentication credentials. In other embodiments, the retrieval may be through locally-saved user session information, a reference to session information via a browser cookie, a unique authentication string for use with a remote application programming interface (API), or other programmatic methods of determining a logged-on user. The user information includes a credit value measured in units of time.

In some embodiments, the credit value may have other components. For example, a credit may be specific to different formats for videos, such as when videos of higher quality (like high definition or HD videos) require more credits. Thus, the credit value may have different units of time for high definition videos and standard definition videos.

The reporting application 270 determines whether a media file is in a format that can be read by the reporting application 270. If the reporting application 270 cannot read a file, the reporting application 270 can halt execution and return an error message. If the media file is readable, the reporting application 270 analyzes the media file in order to determine its length and stores a value for the length of the media file.

The reporting application 270 then returns the value for the length and a unique identifier that represents the user to the server 210. If the reporting application 270 is an integrated portion of the server 210, the reporting application 270 may launch an internal function to report the information. If the reporting application 270 is located remotely, the reporting application may launch an API call over a communication channel. The reporting application 270 may also report additional information. For example, the reporting application 270 may report details about when a media file is uploaded and a sound or video quality of the media file.

The server application 116 checks the validity of the user account information. If the user account information is invalid, the server 210 returns an error message. The server 210 also checks the information about the length and details of the media file. The server application 116 retrieves the credit value for the user's account and modifies the credit value based on the information about the length and details of the media file. For example, the server application 116 may subtract the length of the uploaded file (in terms of units of time) from the user's credit value. In other embodiments, the server 210 may use the file format, the storage size of the file, or any other details about the media file to determine the amount to subtract from the user's credit value. The server 210 may report the new credit value to the client 205. The server 210 may also alert the user visually or by email.

Figure 8:
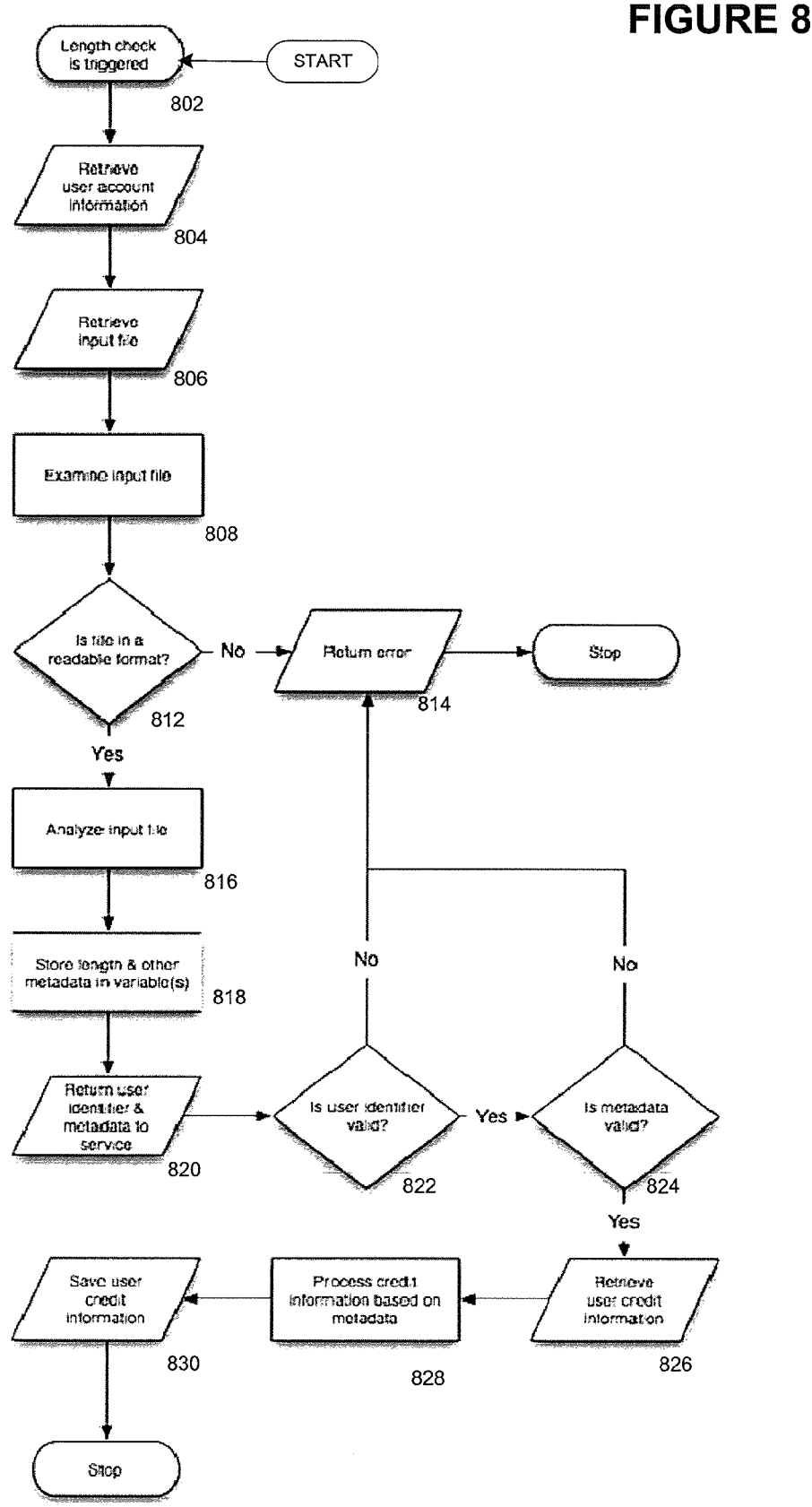
FIG. 8 illustrates an example process for depleting account credit based on a length of a digital media file in accordance with various embodiments of the present disclosure.

FIG. 8 illustrates an example process for depleting account credit based on a length of a digital media file according to various embodiments of the present disclosure. The process can be performed, for example, by one or more client computers, such as client computers 110-114 in FIG. 1 and/or client 205 in FIG. 2. The process can be implemented by executable instructions stored in a non-transitory computer-readable medium that cause one or more devices to perform such a process.

The process begins by identifying that a file length check was triggered (step 802). In step 802, the file length check may be triggered by a user uploading a file. The process retrieves user account information (step 804) and an input file (step 806). The process examines the input file (step 808) and determines whether the file is in a readable format (step 812). If the file is not in a readable format, the process returns an error message (step 814) and terminates.

If the file is in a readable format, the process analyzes the input file (step 816). In step 816, the process analyzes the input file to determine a length of the file. The process may also identify other details about the file, such as a file format or quality of the file. The process stores the length of the file and an identifier for the file in metadata (step 818). The process retrieves a user identifier and metadata (step 820). The process determines whether the user identifier is valid (step 822). If the user identifier is not valid, the process returns to step 814 and returns an error message. If the user identifier is valid, the process determines whether the metadata is valid (step 824). If the metadata is not valid, the process returns to step 814 and returns an error message. If the metadata is valid, the process retrieves user credit information (step 826). The process processes the user credit information based on the metadata (step 828). The process saves updated user credit information (step 830) and terminates.

The flowcharts and block diagrams in the figures above illustrate architectures, functionalities, and operations of possible implementations of systems, methods and computer program products according to various illustrative embodiments of this disclosure. In this regard, each element in a flowchart or block diagram may represent a module, segment, function, and/or at least a portion of an operation or step. For example, one or more blocks may be implemented as program code, in hardware, or a combination of program code and hardware. In some alternative implementations, the function or functions noted in a block or group of blocks may occur out of the order noted in the figures. For example, in some cases, two blocks shown in succession may be executed substantially concurrently, or the blocks may sometimes be executed in a reverse order depending on the functionality involved. Also, other blocks may be added in addition to the illustrated blocks in a flowchart or block diagram.

Finally, embodiments of the present disclosure enable server side support for buying and selling digital media files. In various embodiments, the client application 118 may connect to a marketplace 120 for buying and selling digital media files. For example, client application 118 can connect to marketplace 120 via an Application Programming Interface (API). Client application 118 may be a standalone software application, a plug-in to an existing application, a web application and/or any other type of software that can make use of API services. Communication between client application 118 and marketplace 120 can use any common machine-readable format. For example, client application 118 may use extensible markup language (XML) or JavaScript object notation (JSON).

Client application 118 also manages a user account. The user account may contain a credit value. The credit value may be measured in currency or another metric, such as media file length. The user accounts may be set up by an interface provided in client application 118 or via a human-readable interface, such as over the web. Users can also add account credits and payment information via one or more interfaces.

In some embodiments, client application 118 establishes an authenticated connection with marketplace 120 using the API. For example, client application 118 can establish the connection via tokenized authentication. As a particular example, client application 118 may use the OAuth authentication protocol or any suitable established authentication protocol. Client application 118 may access marketplace 120 as an anonymous, public user. However, authentication may be required for a user to participate in buying or selling activities.

Once a connection is established, client application 118 may query marketplace 120 for available media items. Client application 118 may query in a number of ways. For example, client application 118 may query media items filtered or ordered by date; files filtered by arbitrary metadata (such as title, tagging, format, rating, price or creator); details inherent to the media file (such as volume level, overall color values, length or aspect ratio); and/or combinations thereof. The query may also limit the number of results returned and provide an offset. For example, the query may request the first 50 items or 50 items skipping the first 50. The query may also request items that the current user has previously purchased.

Marketplace 120 responds to a query by returning details about media items that match both the request and details relating to the user's account. The response may also include overall totals for the request. Thus, client application 118 can efficiently make further requests. For example, client application 118 may request to paginate between screens of media items. Marketplace 120 may restrict certain types of media items to certain users or user groups. If the user account for client application 118 is not within the group of users, marketplace 120 may not return or include these types of media items in a response.

Marketplace 120 can provide various details about media items. These details may include, for example, a Universally Unique Identifier (UUID) that refers to the item, descriptive information, thumbnails, locations of preview media (such as a streaming preview of video), pricing information, and available metadata. In an example where the user has purchased the media item, the details may include the full URI for client application 118 to download or view the complete media item.

In an example where a user has not already purchased an item, client application 118 may request to purchase the item. Purchasing may not be available for public users. Client application 118 can send a request to purchase the item, and the request may include the item's UUID. Marketplace 120 identifies whether the user account has enough credit to purchase the item. Marketplace 120 may identify credit amounts by attempting to obtain payment using the payment details from the user account. Marketplace 120 may also check an account credit value. If the user account has enough credit, marketplace 120 flags the media item as having been purchased for the user account. Marketplace 120 sends a success response to client application 118. An account of an original owner of the media item may be credited a previously agreed amount. If the payment was not successful, marketplace 120 returns a failure response with details about why the request was unsuccessful.

A user of client application 118 may also place a media item for sale in marketplace 120. In this example, client application 118 can attempt to upload the media item using an Internet file transfer method. For example, client application 118 may use FTP, a file transfer over HTTP, or any other method for uploading files via the Internet. Once client application 118 has uploaded the file to marketplace 120, client application 118 receives a UUID for the media item. Client application 118 also sends details about the item. For example, the details may include the UUID, identifiers used by client application 118, pricing information, and metadata that could be used to search for the media item. Marketplace 120 checks whether the authenticated user of client application 118 has the right to place an item for sale. If the authenticated user has the right, marketplace 120 adds the item to marketplace 120 and returns a success message. If not, marketplace 120 returns a failure response with details about why the request was unsuccessful.

A user may request to edit information about an item previously added to the marketplace. Client application 118 sends an authenticated request to edit a media item with the UUID of the item and any changed information. Marketplace 120 checks to ensure whether the authenticated user has permission to edit the media item. If the user has permission, marketplace 120 edits the item and returns a success message. If the user does not have permission, marketplace 120 returns a failure message with details about why the request was unsuccessful.

A user may also request to remove a media item from marketplace 120. Client application 118 sends an authenticated request to remove a media item. The request includes the UUID of the item. Marketplace 120 checks to ensure whether the authenticated user has permission to remove the media item. If the user has permission, marketplace 120 flags the media item as removed from marketplace 120 and returns a success message. If the user does not have permission, marketplace 120 returns a failure message with details about why the request was unsuccessful. If removed, marketplace 120 may no longer return the removed item in queries to marketplace 120, except to users who have previously bought the now removed item.

Figure 9:
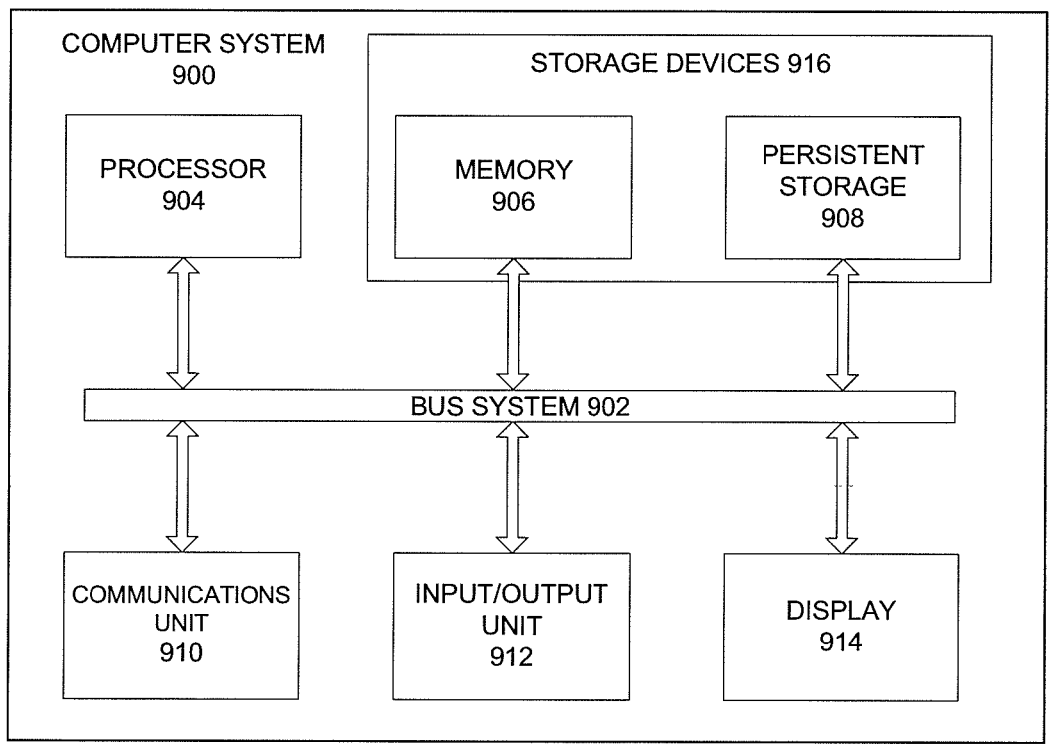
FIG. 9 illustrates an example computing system capable of implementing various embodiments of the present disclosure.

FIG. 9 illustrates an example computing system 900 in accordance with various embodiments of the present disclosure. The computing system 900 could, for example, represent an implementation of the client computers 110-114 or server computers 104-106 in FIG. 1 and/or the client 205 and the server 210 in FIG. 2. In this example, the computing system 900 includes a bus system 902, which provides communications between a processor 904, a memory 906, a persistent storage 908, a communications unit 910, an input/output (I/O) unit 912, and a display 914.

The processor 904 processes instructions for software that may be loaded into the memory 906. The processor 904 may include a number of processors, a multi-processor core, or some other type of processor depending on the particular implementation. Further, the processor 904 may be implemented using a number of heterogeneous processor systems in which a main processor is present with secondary processors on a single chip. As another example, the processor 904 may be a symmetric multi-processor system containing multiple processors of the same type.

The memory 906 and the persistent storage 908 are examples of storage devices 916. A storage device is any piece of hardware capable of storing information, such as data, program code, and/or other suitable information on a temporary or a permanent basis. The memory 906 in the embodiments above may be, for example, a random access memory or any other suitable volatile or non-volatile storage device. The persistent storage 908 may contain one or more components or devices. For example, the persistent storage 908 may be a hard drive, a flash memory, an optical disk, a rewritable magnetic tape, or any other type of persistent storage device. The media used by the persistent storage 908 also may be removable, such as when a removable hard drive is used as the persistent storage 908.

The communications unit 910 provides for communications with other computer systems or devices. As an example, the communications unit 910 could include a network interface card or a wireless transceiver. The communications unit 910 may be implemented in the uploader 235, receiver 245, and transmitter 255 in FIG. 2. The communications unit 910 may provide communications through physical or wireless communications links.

The input/output unit 912 allows for input and output of data using other devices that may be connected to the computer system 900. For example, the input/output unit 912 may provide a connection for user input through a keyboard, a mouse, or other suitable input device. The input/output unit 912 may also send output to a display, printer, or other suitable output device. The display 914 provides a mechanism to visually present information to a user.

Program code for an operating system, applications, or other programs may be located in the storage devices 916, which are in communication with the processor 904 through the bus system 902. In some embodiments, the program code is in a functional form on the persistent storage 908. These instructions may be loaded into the memory 906 for processing by the processor 904. The processes of the different embodiments may be performed by the processor 904 using computer implemented instructions, which may be located in the memory 906.

In some embodiments, various functions described above are implemented or supported by a computer program product that is formed from computer readable program code and that is embodied in a computer readable medium. Program code for the computer program product may be located in a functional form on a computer readable storage device that could be selectively removable and may be loaded onto or transferred to the computing system 900 for processing by the processor 904. In some embodiments, the program code may also be downloaded over a network to the persistent storage 908 from another device or computer system for use within the computing system 900. For instance, program code stored in a computer readable storage medium in a server computer system may be downloaded over a network from the server to the computing system 900. The computer system providing the program code may be a server computer, a client computer, or some other device capable of storing and transmitting program code.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of", when used with a list of items, means that different combinations of one or more of the listed items may be used, and only one item in the list may be needed. For example, "at least one of item A, item B, and item C" may include, without limitation, item A or item A and item B.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
sending, to a client device, a computer program for compressing and sending media files, the computer program comprising program code that, when executed by at least one processor at the client device, causes the client device to:
identify information about a media file including a type of content included in the media file in response to receiving a request to send a media file;
determine whether the media file is compressible based on the identified information;
identify a compression algorithm based on the identified type of content included in the media file;
compress the media file using the compression algorithm; and
send, while the media file is being compressed, one or more compressed segments of the media file to one or more server computers; and
receiving the compressed media file sent from the client device.

2. The method of claim 1, wherein the program code that, when executed by at least one processor at the client device, causes the client device to identify the information about the media file comprises program code that, when executed by at least one processor at the client device, causes the client device to identify a location of the media file on the client device, a file format of the media file, and selected configuration options of how to compress the media file.

3. The method of claim 2, wherein the program code that, when executed by at least one processor at the client device, causes the client device to determine whether the media file is compressible comprises program code that, when executed by at least one processor at the client device, causes the client device to determine whether the file format is compatible with a plurality of compression algorithms supported by the computer program.

4. The method of claim 1, wherein the program code that, when executed by at least one processor at the client device, causes the client device to identify the compression algorithm based on the identified information comprises program code that, when executed by at least one processor at the client device, causes the client device to identify the compression algorithm also based on at least one of a file format of the media file or a size of the media file.

5. The method of claim 1, wherein the program code that, when executed by at least one processor at the client device, causes the client device to send the compressed media file comprises program code that, when executed by at least one processor at the client device, causes the client device to separate, while the media file is being compressed, portions of the media file that have been compressed into a plurality of compressed segments of the media file.

6. The method of claim 5, wherein receiving the compressed media file comprises receiving the plurality of compressed segments of the media file, the method further comprising combining the plurality of compressed segments to form the media file.

7. The method of claim 1, wherein the computer program is sent to the client device from a first server computer and the compressed media file is received by a second server computer.

8. A system comprising:
one or more server computers configured to send a computer program for compressing and sending media files to a client device, the computer program comprising program code that, when executed by at least one processor at the client device, causes the client device to:
identify information about a media file including a type of content included in the media file in response to receiving a request to send a media file;
determine whether the media file is compressible based on the identified information;
identify a compression algorithm based on the identified type of content included in the media file;
compress the media file using the compression algorithm; and
send, while the media file is being compressed, one or more compressed segments of the media file to the one or more server computers.

9. The system of claim 8, wherein the program code that, when executed by at least one processor at the client device, causes the client device to identify the information about the media file comprises program code that, when executed by at least one processor at the client device, causes the client device to identify a location of the media file on the client device, a file format of the media file, and selected configuration options of how to compress the media file.

10. The system of claim 9, wherein the program code that, when executed by at least one processor at the client device, causes the client device to determine whether the media file is compressible comprises program code that, when executed by at least one processor at the client device, causes the client device to determine whether the file format is compatible with a plurality of compression algorithms supported by the computer program.

11. The system of claim 8, wherein the program code that, when executed by at least one processor at the client device, causes the client device to identify the compression algorithm based on the identified information comprises program code that, when executed by at least one processor at the client device, causes the client device to identify the compression algorithm also based on at least one of a file format of the media file or a size of the media file.

12. The system of claim 8, wherein the program code that, when executed by at least one processor at the client device, causes the client device to send the compressed media file comprises program code that, when executed by at least one processor at the client device, causes the client device to separate, while the media file is being compressed, portions of the media file that have been compressed into a plurality of compressed segments of the media file.

13. The system of claim 12, wherein the one or more server computers are configured to receive the plurality of compressed segments of the media file and combine the plurality of compressed segments to form the media file.

14. A non-transitory computer-readable medium embodying a computer program, the computer program comprising computer-readable program code that, when executed by at least one processor at a client device, causes the client device to:
identify information about a media file including a type of content included in the media file in response to receiving a request to send a media file;
determine whether the media file is compressible based on the identified information;
identify a compression algorithm based on the identified type of content included in the media file;
compress the media file using the compression algorithm; and
send, while the media file is being compressed, one or more compressed segments of the media file to one or more server computers.

15. The computer-readable medium of claim 14, wherein the program code that, when executed by at least one processor at the client device, causes the client device to identify the information about the media file comprises program code that, when executed by at least one processor at the client device, causes the client device to identify a location of the media file on the client device, a file format of the media file, and selected configuration options of how to compress the media file.

16. The computer-readable medium of claim 15, wherein the program code that, when executed by at least one processor at the client device, causes the client device to determine whether the media file is compressible comprises program code that, when executed by at least one processor at the client device, causes the client device to determine whether the file format is compatible with a plurality of compression algorithms supported by the computer program.

17. The computer-readable medium of claim 14, wherein the program code that, when executed by at least one processor at the client device, causes the client device to identify the compression algorithm based on the identified information comprises program code that, when executed by at least one processor at the client device, causes the client device to identify the compression algorithm also based on at least one of a file format of the media file or a size of the media file.

18. The computer-readable medium of claim 14, wherein the program code that, when executed by at least one processor at the client device, causes the client device to send the compressed media file comprises program code that, when executed by at least one processor at the client device, causes the client device to separate, while the media file is being compressed, portions of the media file that have been compressed into a plurality of compressed segments of the media file.

19. The computer-readable medium of claim 18, further comprising program code that, when executed by at least one processor at a server computer, causes the server computer to:
receive the plurality of compressed segments of the media file sent from the client device; and
combine the plurality of compressed segments to form the media file.

20. The computer-readable medium of claim 14, wherein the computer program further comprises program code that, when executed by at least one processor at a server computer, causes the server computer to:
send a computer program for compressing and sending media files to a client device; and
receive the compressed media file sent from the client device.

* * * * *